United States Patent
Simonini et al.

(10) Patent No.: US 10,272,899 B2
(45) Date of Patent: Apr. 30, 2019

(54) CONTROLLING THE POWERTRAIN OF A VEHICLE

(71) Applicant: Proterra Inc., Greenville, SC (US)

(72) Inventors: Matthew Simonini, Greenville, SC (US); Jarred Vallbracht, Greenville, SC (US)

(73) Assignee: Proterra Inc., Burlingame, CA (US)

(*) Notice: Subject to any disclaimer, the term of this patent is extended or adjusted under 35 U.S.C. 154(b) by 0 days.

(21) Appl. No.: 15/727,221

(22) Filed: Oct. 6, 2017

(65) Prior Publication Data

US 2019/0039592 A1    Feb. 7, 2019

Related U.S. Application Data

(60) Provisional application No. 62/539,823, filed on Aug. 1, 2017.

(51) Int. Cl.
| | |
|---|---|
| *B60W 10/08* | (2006.01) |
| *B60W 30/188* | (2012.01) |
| *B60L 11/18* | (2006.01) |
| *B60K 1/02* | (2006.01) |
| *B60W 20/30* | (2016.01) |
| *B60W 30/18* | (2012.01) |

(52) U.S. Cl.
CPC ............ *B60W 10/08* (2013.01); *B60K 1/02* (2013.01); *B60L 11/18* (2013.01); *B60W 30/188* (2013.01); *B60L 11/1812* (2013.01); *B60W 20/30* (2013.01); *B60W 30/18109* (2013.01)

(58) Field of Classification Search
CPC ...... B60K 17/043; B60K 7/00; B60K 7/0007; B60K 17/12; B60K 17/14
See application file for complete search history.

(56) References Cited

U.S. PATENT DOCUMENTS

| | | | | |
|---|---|---|---|---|
| 5,879,265 | A * | 3/1999 | Bek ..................... | B60K 6/52 180/65.6 |
| 8,453,773 | B2 | 6/2013 | Hill et al. | |
| 2004/0200648 | A1* | 10/2004 | Tarasinski ............. | B60K 6/46 180/65.7 |
| 2006/0079368 | A1* | 4/2006 | Hemphill ............... | F16H 3/006 475/214 |
| 2014/0070767 | A1 | 3/2014 | Morris et al. | |
| 2014/0190309 | A1* | 7/2014 | Moosmann ........... | B60K 6/387 74/665 F |
| 2017/0320382 | A1* | 11/2017 | Milton ................... | B60G 3/06 |
| 2018/0043898 | A1* | 2/2018 | Andersson ........... | B60W 10/04 |

* cited by examiner

*Primary Examiner* — James A Shriver, II
*Assistant Examiner* — James J Triggs
(74) *Attorney, Agent, or Firm* — Bookoff McAndrews, PLLC

(57) ABSTRACT

The vehicle includes a powertrain having an axle having a first drive wheel and a second drive wheel. A first gearbox may couple a first power source to the first drive wheel, and a second gearbox may independently couple a second power source to the second drive wheel. And, a controller may be configured to initiate a gear shift in the first gearbox and the second gearbox at different times.

20 Claims, 4 Drawing Sheets

CONTROLLING THE POWERTRAIN OF A VEHICLE

CROSS-REFERENCE TO RELATED APPLICATIONS

This application claims the benefit of U.S. Provisional Application No. 62/539,823, filed Aug. 1, 2017, the disclosure of which is incorporated herein by reference in its entirety.

TECHNICAL FIELD

Embodiments of this disclosure relate to systems for controlling the powertrain of a vehicle.

BACKGROUND

The powertrain of a vehicle refers to a group of components that generate and deliver power to the road surface to propel the vehicle along the road. In general, the powertrain includes a power source that generates or provides power, and a transmission that transmits the power to the drive wheels of the vehicle. In an electric vehicle, or a hybrid vehicle operating in the electric mode, one or more electric motors serve as the power source. In such vehicles, a battery provides power to drive the motors to produce torque. An inverter coupled to the motors directs current to the motors to produce torque in response to a torque request by a driver of the vehicle. The driver controls the position of the accelerator and brake pedals to request different amounts of torque from the motors. When the driver presses down on (or depresses) the accelerator pedal, a controller detects the position of the pedal and sends a signal to the motors to increase the torque produced. When the driver releases the accelerator pedal and/or presses down on the brake pedal, the controller sends a signal to the motors to decrease the torque produced.

The transmission transmits the rotational power produced by the motors to the drive wheels of the vehicle. The transmission includes components that convert the speed and torque produced by the motor to that desired by the vehicle. One form of a transmission includes one or more gearboxes that use gears to provide speed and torque conversions between the motors and the drive wheels. Typically, an input shaft inputs power from a motor to a gearbox and an output shaft outputs the power from the gearbox to a drive wheel. The gearboxes include gears that selectively engage or disengage to increase or decrease the speed/torque between the input and output shafts. Typically, a control unit of the powertrain initiates a gear shift in the transmission in response to driving conditions.

In current transmissions with multiple gearboxes, gear shifting is initiated in each gearbox simultaneously. Such simultaneous gear shifting may affect the performance of the vehicle in some cases. Embodiments of the current disclosure may address these limitations and/or other problems in the art.

SUMMARY

Embodiments of the present disclosure relate to, among other things, devices and methods for controlling the powertrain of a vehicle. Each of the embodiments disclosed herein may include one or more of the features described in connection with any of the other disclosed embodiments.

In one embodiment, a vehicle is disclosed. The vehicle includes a powertrain including an axle having a first drive wheel and a second drive wheel. A first gearbox may couple a first power source to the first drive wheel, and a second gearbox may independently couple a second power source to the second drive wheel. The vehicle may also include a controller configured to initiate a gear shift in the first gearbox and the second gearbox at different times.

In another embodiment, a method of controlling a power train of a vehicle is disclosed. The method may comprise directing power from a first power source to a first drive wheel of an axle through a first gearbox, and independently directing power from a second power source to a second drive wheel of the axle through a second gearbox. The method may also include initiating a gear shift in the first gearbox and the second gearbox at different times.

In yet another embodiment, a vehicle is disclosed. The vehicle includes a powertrain comprising an axle having a first drive wheel and a second drive wheel. A first electric motor may be coupled to the first drive wheel via a first gearbox, and a second electric motor may be independently coupled to the second drive wheel via a second gearbox. The vehicle may also include a controller configured to initiate a gear shift in the second gearbox after receipt of a signal indicating that the first gearbox has completed gear shifting.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes a system and method for controlling the transmission of a vehicle. While principles of the current disclosure are described with reference to an electric vehicle, it should be understood that the disclosure is not limited thereto. Rather, the systems and methods of the present disclosure may be used in any vehicle having a transmission with multiple gearboxes. As used herein, the term "electric vehicle" includes any vehicle or transport machine that is driven at least in part by electricity (e.g., hybrid vehicles, all-electric vehicles, etc.).

Figure 1A:
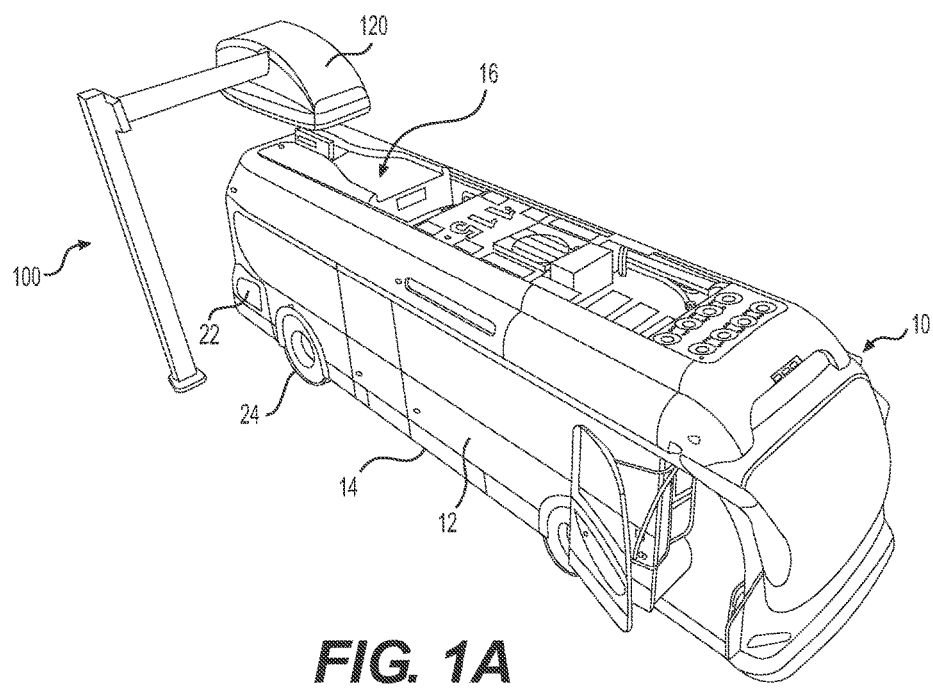
FIGS. 1A and 1B illustrate an exemplary electric bus according to the present disclosure.
Figure 1B:
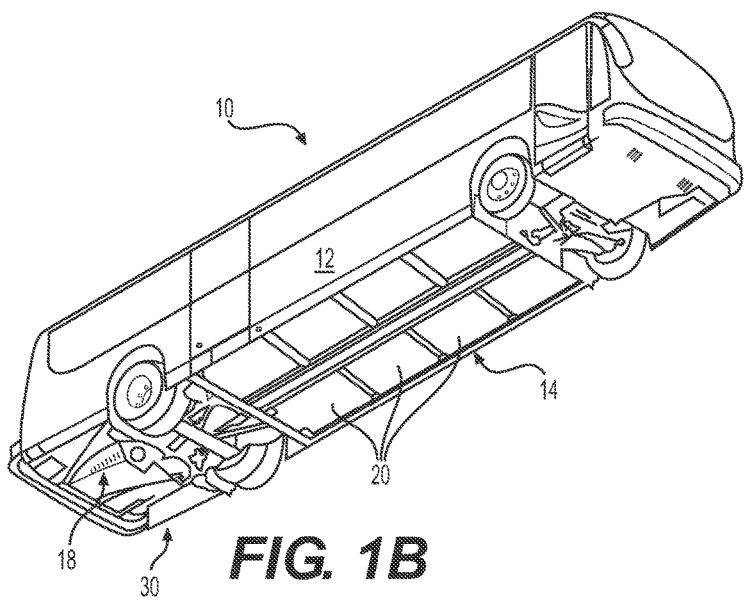

FIGS. 1A and 1B illustrate an electric vehicle in the form of a bus 10. FIG. 1A shows the bus 10 with its roof visible, and FIG. 1B shows the bus 10 with its undercarriage visible. In the discussion below, reference will be made to both FIGS. 1A and 1B. Electric bus 10 may include a body 12 enclosing a space for passengers. In some embodiments, some (or substantially all) parts of body 12 may be fabricated using one or more composite materials to reduce the weight of bus 10. Without limitation, body 12 of bus 10 may have any size, shape, and configuration. In some embodiments, bus 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches from the road surface. In this disclosure, the term "about" is used to indicate a possible variation of ±10% in a stated numeric value.

Bus 10 may include a powertrain 30 that propels the bus 10 along a road surface. Powertrain 30 may include one or more electric motors that generate power, and a transmission that transmits the power to a pair of drive wheels (e.g., wheels 24) of the bus 10. Batteries 14 may store electrical energy to power the electric motors of the powertrain 30. In some embodiments, these batteries 14 may be configured as a plurality of battery packs 20 positioned in cavities located under the floor of the bus 10 (see FIG. 1B). In some embodiments, some or all of the battery packs 20 may be positioned elsewhere (e.g., roof) on the bus 10. The batteries 14 may have any chemistry and construction. The battery chemistry and construction may enable fast charging of the batteries 14. In some embodiments, the batteries 14 may be lithium titanate oxide (LTO) batteries. In some embodiments, the batteries 14 may be nickel metal cobalt oxide (NMC) batteries. It is also contemplated that, in some embodiments, the batteries 14 may include multiple different chemistries. Some of the possible battery chemistries and arrangements in bus 10 are described in commonly assigned U.S. Pat. No. 8,453,773, which is incorporated herein by reference in its entirety.

A charging interface 16 may be provided on the roof of the bus 10 to charge the batteries 14. The charging interface 16 may include components that interface with the charging head 120 of an external charging station 100 to charge the batteries 14. Some possible embodiments of charging interfaces 16 that may be used for bus 10 are described in commonly-assigned U.S. Patent Application Publication No. 2014/0070767, which is incorporated by reference in its entirety herein. Alternatively or additionally, bus 10 may include other charging interfaces, such as, for example, a charge port 22 (e.g., an electric socket) that is configured to receive a charging plug and charge the bus 10 using power from a utility grid. In such embodiments, the bus 10 may additionally or alternatively be charged by connecting the plug to the socket. Some possible embodiments of charge port 22 that may be used for bus 10 are described in commonly-assigned U.S. patent application Ser. No. 15/589,281, filed May 8, 2017, which is incorporated by reference in its entirety herein.

Figure 2:
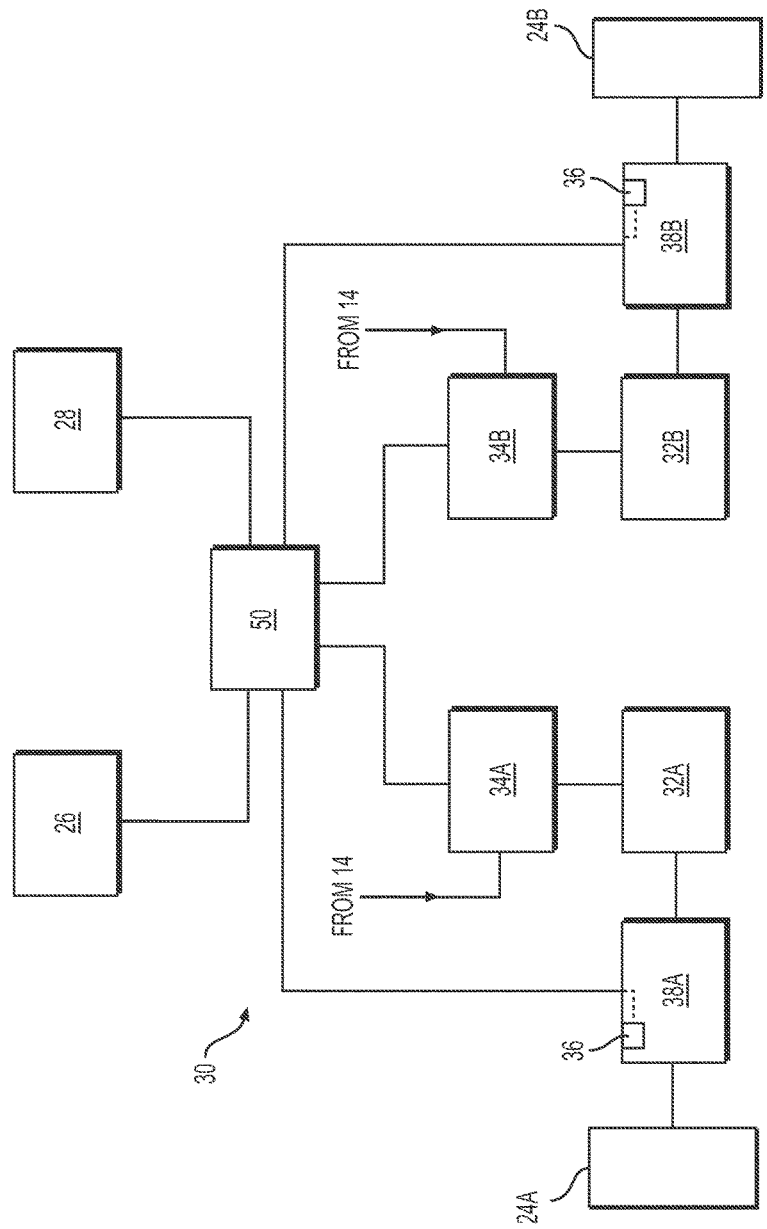
FIG. 2 is a schematic illustration of an exemplary powertrain of the bus of FIGS. 1A and 1B.

FIG. 2 is a schematic illustration of an exemplary powertrain 30 of bus 10. As illustrated in FIG. 2, powertrain 30 includes two electric motors (first motor 32A and second motor 32B), each independently coupled to a drive wheel 24 (first wheel 24A and second wheel 24B) of the bus 10 through a gearbox 38 (first gearbox 38A and second gearbox 38B). It should be noted that the arrangement of the powertrain 30 illustrated in FIG. 2 is only exemplary, and other arrangements are possible. In the illustrated embodiment, the components of the power train 30 are packaged such that these components extend linearly between two drive wheels 24 (i.e., first wheel 24A and second wheel 24B) of the bus 20. These drive wheels may be the pair of rear wheels in a rear-wheel drive bus, the pair of front wheels in a front-wheel drive bus, or a pair of wheels between the front and rear wheels, for example, in a three-axle articulated bus. However, this is not a requirement, and the components of the powertrain 30 may be arranged in any manner (such as, for example, extending longitudinally along the length of the bus).

Although powertrain 30 is illustrated as having two electric motors 32, this is only exemplary. In general, the powertrain 30 may include any number of electric motors 32. For example, in some embodiments, a single electric motor 32 may provide power to all the drive wheels of the bus 10 through a single gearbox or multiple gearboxes, and in some embodiments, multiple electric motors may provide power to each drive wheel through a single gearbox or multiple gearboxes. The electric motors 32A and 32B may be permanent magnet synchronous motors (AC motors) that operate using power from the batteries 14. In some embodiments, high voltage DC power from the batteries 14 may be converted into 3-phase AC power using an inverter 34 (a single inverter or, as illustrated in FIG. 2, using a first inverter 34A and a second inverter 34B) and directed to the motors 32. In some embodiments, a dual channel inverter (e.g., a single inverter having different channels that provide power to, and control of, the motors independently) may be used in place of two inverters (i.e., first inverter 34A and second inverter 34B).

The first motor 32A and the second motor 32B may be the same or substantially similar to each other, the first gearbox 38A and the second gearbox 38B may be the same or substantially similar to each other, and the first inverter 34A and the second inverter 34B may be similar to each other. However, this is not a requirement, and in some embodiments, the first motors 32A may be different from the second motor 32B (different torque rating, etc.), the first gearbox 38A may be different from the second gearbox 38B (different gear ratios, etc.), and the first inverter 34A may be different than the second inverter 34B (e.g., corresponding to the different motors, etc.). However, for simplicity, in the discussion that follows, the first motor 32A is considered to be substantially similar to the second motor 32B, the first gearbox 38A is considered to be substantially similar to the second gearbox 38B, and the first inverter 34A is considered to be substantially similar to the second inverter 34B. Therefore, only the first motor 32A, the first gearbox 38A, and the first inverter 34A, and their interconnection will be described herein. These descriptions also apply to the second motor 32B, the second gearbox 38B, and the second inverter 34B, and their interconnections. In the discussion below, the first gearbox 38A (on the left side of FIG. 2) will be referred to as the street-side gearbox, and the second gearbox 38B (on the right side) will be referred to as the curb-side gearbox.

First motor 32A rotates an input shaft that connects the first motor 32A to the first gearbox 38A. An output shaft from the first gearbox 38A rotates the first wheels 24A directly (as illustrated in FIG. 2) or via a speed reduction unit (e.g., connected between the first gearbox 38A and the first wheel 24A) (not shown). In general, the torque output of the first motor 32A is proportional to the magnitude of the current directed into the first motor 32A from the first inverter 34A. Although the first motor 32A is described as a permanent magnet synchronous motor, as noted above, one or more other types of motors may be used in powertrain 30.

First gearbox 38A may be a multi-speed gearbox which includes a plurality of gears (not shown) configured to switch between different gear ratios to convert the rotational speed (and torque) of the gearbox input shaft to several different speeds (and torques) of the gearbox output shaft. While, in general, any type of gearbox with any number of gear ratios may be used in bus 10, in some embodiments, first gearbox 38A may be a two-speed automated manual transmission that provides two gear ratios (e.g., a high gear and a low gear) using a set of planetary gears (or another type of gears). In the low gear, the speed of rotation of the gearbox output shaft may be lower than the speed of rotation of the gearbox input shaft. And, in the high gear, the speed of rotation of the output shaft may be greater than or equal to that of the input shaft. As is known in the art, the planetary gears may include sun, ring, carrier and planetary gears, and a plurality of clutches adapted to selectively couple several of the gears together to change the gear ratio between the input shaft and the output shaft (of the first gearbox 38A) based on instructions from a control unit 50.

The low and high gears may be activated by engaging (and/or disengaging) selected gears and clutches of the first gearbox 38A to obtain two different gear ratios between the input and output shafts. The two gear ratios convert the speed/torque of the gearbox input shaft to two different speeds/torques of the gearbox output shaft. The first gearbox 38A may be shifted between the low gear and the high gear automatically or manually, through the control unit 50 to suit different operating states of the bus. For example, during acceleration, based on the position of the accelerator pedal 26 and the speed of the bus 10, the control unit 50 may switch from the low gear to the high gear, and during deceleration, based on the position of the brake pedal 28 and the speed of the bus 10, the control unit 50 may switch the first gearbox 38A from a high gear to a low gear. The first gearbox 38A may pass through its neutral position when transitioning from the high gear to the low gear, or when transitioning from the low gear to the high gear. When the first gearbox 38A is in its neutral position, the gearbox input shaft and the gearbox output shaft of the first gearbox 38 are decoupled, thus inhibiting power transfer to the first wheel 24A through the first gearbox 38A.

The first gearbox 38A may include one or more sensors 36 that indicate to the control unit 50 when a requested gear shift is complete. These sensors 36 may detect whether or not the gears of the first gearbox 38A engage, and relay this data to the control unit 50 by way of a gear engagement signal. Any type of sensor configured to detect engagement of the gears may be used as sensor 36. In some embodiments, sensor 36 may be a position sensor that detects whether (or not) the gears of the first gearbox 38A are in engagement based on a position of a gear shifting element (e.g., an element that moves the gears in engagement) of the first gearbox 38A. For example, in some embodiments, when the shifting element moves into a position corresponding to the engagement of the gears, a biased (e.g., by a spring) ball may descent into a groove in the shifting element to indicate gear engagement. In contrast, when the gears do not successfully engage (that is, do not engage or only partially engages), the ball may not descent into the groove. Sensor 36 may also be a device that is not specifically made for detecting engagement, but may nonetheless be used to infer gear engagement. For example, in some embodiments, sensor 36 may include an output shaft speed sensor that can be used to infer engagement when the detected speed matches an expected speed (e.g., when the ratio of input to output speed of the transmission is equal to the desired gear ratio). Based on the gear engagement signal from the sensor 36 (or another device), the control unit 50 may detect whether or not a requested gear shift is complete in a gearbox. For example, when the control unit 50 instructs the first gearbox 38A to switch from its low gear to high gear (or vice versa), a gear engagement signal from sensor 36 of the first gearbox 38A indicates to the control unit 50 that the requested gear shift is complete in the first gearbox 38A.

The control unit 50 may be an integrated master control system that controls several operations of the bus 10. In some embodiments, control unit 50 may be a distributed control system as known to people of ordinary skill in the art. That is, the functions of control unit 50 may be divided between several different control systems (e.g., powertrain controller, inverter/battery controller, vehicle controller, etc.) of the bus 10. As is known in the art, control unit 50 may include a collection of several mechanical, electrical, and integrated circuit devices (for example, computational units, A/D converters, memory, switch, valves, actuators, fuses, etc.) that function collectively to control the operation of the bus 10.

Among other functions, the control unit 50 may control the operation of the powertrain 30 based on several inputs from the bus 10. These inputs may include a signal indicative of the position of the accelerator pedal 26 and the brake pedal 28 of the bus 10. In use, when the driver of the bus 10 desires more torque (e.g., to climb a hill, accelerate, etc.), the driver may press down on the accelerator pedal 26. Pressing down the accelerator pedal 26 (i.e., changing the position of the accelerator pedal 26 from a less-depressed state to a more-depressed state) is indicative of a positive torque request from the driver. Similarly, when the driver wishes less torque, the driver may release the accelerator pedal 26 (i.e., change the position of the accelerator pedal 26 from a more-depressed state to a less-depressed state) or press down on the brake pedal 28 to produce a negative torque request. Position sensors (not shown), operatively coupled to the accelerator pedal 26 and the brake pedal 28, may convert the position of these pedals to voltage signals and provide these signals to the control unit 50. Based on the voltage signal from these pedals (and other sensors, such as a speed sensor), the control unit 50 may send a torque request signal to the first and second inverters 34A and 34B to produce the requested torque. The torque request signal may include signals indicative of a particular value of current and/or voltage that, when directed to the first and second motors 38A, 38B will produce the desired torque.

In some embodiments, control unit 50 may also receive other inputs indicative of the operating conditions of the bus 10. These inputs may include, among others, signals indicative of the state of charge (SOC) of the batteries 14, passenger load, a signal from an inclinometer that is indicative of the grade of the road that the bus 10 is traveling on, signals from sensors that indicate the ambient weather conditions (temperature, precipitation, humidity, etc.). The torque request signal from the control unit 50 to the first and second inverters 34A, 34B may be based on these signals and the driver requested torque. For instance, in some embodiments, when the state of charge of the batteries 14 is below a threshold value, the control unit 50 may decrease (or de-rate) the driver requested torque so that the torque output by the powertrain 30 does not exceed a predetermined threshold value. Similarly, in some embodiments, when the temperature is below a threshold value, and/or when the passenger load is above a threshold value, and/or when the road grade is above or below a threshold value, the control unit 50 may de-rate the requested torque.

As is known in the art, first inverter 34A may be an electronic device (or circuitry) adapted to convert direct current (DC) from the battery 14 to alternating current (AC). In response to a torque request signal from the control unit 50, the first inverter 34 may activate IGBTs (insulated-gate bipolar transistors) or other switches to convert the direct current from the batteries 14 to simulated AC current for the first motor 32A connected to the first inverter 34A. In some embodiments, the first inverter 34A may select the voltage and the frequency of the AC current to produce the desired torque output (positive or negative). First motor 32A may include one or more sensors (speed sensor, torque sensor, etc.) configured to provide a signal indicative of the actual output torque of the first motor 32A to the first inverter 34A and/or the control unit 50. The first inverter 34A may use the output of these sensors as feedback to modify (increase, decrease, etc.) the current directed to the first motor 32A to produce the desired torque output. Additionally or alternatively, in some embodiments, the first inverter 34A may include a sensor (current sensor, etc.) that measures the current directed to the first motor 32A. Since, the torque produced by the first motor 32A is proportional to the current directed to it, the first inverter 34A may use the detected current as a feedback signal for the actual torque output.

Control unit 50 may shift between the different gears of the first gearbox 38A and the second gearbox 38B (i.e., between the high gear and the low gear in the described embodiment) based on data indicative of the operating conditions of bus 10. The operating condition data may include, among others, signals indicative of a desired speed, current motor speed, motor input current (or motor torque), etc. The desired speed may be determined based on operator input (for example, based on the position of the accelerator and brake pedals 26, 28). Motor speed and motor input current data may be signals indicative of the current speed of the motors 32A, 32B, and the electric current input to these motors. Based on this data, the control unit 50 may energize one or more solenoids to move actuators and/or shifting elements in each gearbox 38 to bring different gears into, or out of, engagement to achieve the requested gear shift. As explained previously, a gear engagement signal from the sensor 36 of a gearbox indicates to the control unit 50 that the requested gear shift is complete in that gearbox.

With continuing reference to FIG. 2, in some embodiments, upon instructions from the control unit 50, both the first gearbox 38A and the second gearbox 38B performs a gear shift substantially simultaneously. That is, the control unit 50 may simultaneously instruct both the first gearbox 38A and the second gearbox 38B of the powertrain 30 to shift from its low gear to its high gear, or vice versa. As each gearbox 38A, 38B shifts between its low gear and high gear (or vice versa), it passes through its neutral position. In the neutral position, the input shaft of the gearbox 38A, 38B is decoupled from its output shaft, and therefore, no torque is transmitted to the drive wheel 24A, 24B connected to that gearbox 38A, 38B. In embodiments where both the first gearbox 38A and the second gearbox 38B shift gears simultaneously, both the gearboxes 38A, 38B may be in their neutral configuration substantially simultaneously, and therefore, for a brief period of time, the powertrain 30 may not transmit any torque to the drive wheels 24A, 24B. For example, if the total torque requested by the operator (e.g., based on the accelerator pedal 26 position, etc.) at the current time is 200 Nm (Newton meters), the control unit 50 may direct the first inverter 34A to produce 100 Nm of torque from the first motor 32A, and the second inverter 34B to produce 100 Nm of torque from the second motor 32B. And, based on factors such as speed, etc., the control unit 50 may also request each gearbox 38A, 38B to perform a gear shift (e.g., from low gear to high gear). Since both the first and second gearboxes undergo gear shifting simultaneously, both will transition through its neural position substantially simultaneously, and therefore, the torque directed to the first and second drive wheels 24A, 24B will be zero. This sudden change in torque to both the drive wheels 24A, 24B may detrimentally affect the performance (e.g., driver may feel a momentary loss of power) and ride quality (e.g., felt as jolt to the passengers). Therefore, as explained further below, in some embodiments, the control unit 50 may stagger the shifting of the gears in the first and second gearboxes 38A, 38B.

In some embodiments, the control unit 50 may initiate a gear shift in one gearbox (e.g., first gearbox 38A) first, and the gear shift in other gearbox (i.e., second gearbox 38B) second. For example, in some embodiments, the control unit 50 may wait till it receives a gear engagement signal from sensor 36 (that indicates a successful completion of the gear shift) from the first gearbox 38A before it initiates the gear shift in the second gearbox 38B. In some embodiments, the control unit 50 may wait for a predetermined period of time (100 millisecond, 300 millisecond, 500 milliseconds, 700 milliseconds, etc.) after initiating gear shifting in the first gearbox 38A before initiating the gear shift in the second gearbox 38B. In the discussion below, performing gear shifting in one of the gearboxes of the powertrain first, and gear shifting in another gearbox of the powertrain second, is referred to as split-shifting.

When split-shifting is performed in a powertrain 30, there will be a delay in time between when one of the drive wheels experiences zero torque and the other drive wheel experiences zero torque (because each gearbox transitions through its neutral state at different times). Although this will cause one of the drive wheels of the bus 10 to transfer zero torque while the other drive wheel is transferring torque, this is not considered to be a significant issue in a heavy-duty vehicle, such as a bus, which has a relatively low power-to-weight ratio as compared to, for example, a passenger car (for example, a bus has a power-to-weight ratio of about 400 HP/30,000 lbs≅0.01 HP/lb as compared to a high performance car which has a power-to-weight ratio of about 400 HP/4000 lb≅0.1 HP/lb).

In general, the control unit 50 may initiate gear shift in any of the two gearboxes (i.e., the first gearbox 38A or the second gearbox 38B) first, and the other gearbox second. That is, the control unit 50 may initiate a gear shift in either the street-side or the curb-side gearbox first, and then initiate a gear shift in the other gearbox (after the gear shift in one gearbox is complete, after a predetermined amount of time, etc.). In some embodiments, the control unit 50 may alternate the gearbox in which gear shifting is done first. For example, if gear shifting is first done on the curb-side gearbox now, gear shifting will be first done on the street-side gearbox the next time. A counter in the control unit 50 may keep track of which gearbox is gear shifted first.

In some embodiments, the gearbox which is gear shifted first may depend on the operating state (taking a left turn, taking a right turn, etc.) of the bus 10. For example, when the bus 10 is taking a left turn, the control unit 50 may perform gear shifting first on the street-side gearbox (i.e., the first gearbox 38A which will be the gearbox on the inner side of the turn), and then perform gear shifting on the curb-side gearbox second (i.e., the second gearbox 38B.). And, when the bus 10 is taking a right turn, the control unit 50 may first perform gear shifting on the curb-side gearbox, and then perform gear shifting on the street-side gearbox second. Performing gear shifting in this manner may assist in making the turn by delaying the loss of power on the drive wheel which is on the outer side of the turn. The control unit 50 may determine the direction of the turn based on input from sensors (e.g., sensors that detect steering position, wheel position, etc.). It is also contemplated that, in some embodiments, the curb-side gearbox is shifted first when making a left turn, and the street-side gearbox is shifted first when making a right turn. In some embodiments, the gear shifting (e.g., on both gearboxes) may be delayed until after the completion of the turn.

As explained previously, the control unit 50 controls the powertrain 30 such that each electric motor 32A, 32B produces half the total requested power. That is, if the total requested torque is 200 Nm (based on operator input via the accelerator pedal 26, brake pedal 28, current speed, etc.), the control unit 50 directs (via its inverter) the first motor 32A and the second motor 32B to each to output 100 Nm, so that the total power output by the powertrain 30 is 200 Nm. During split-shifting, in some embodiments, while the first gearbox 38A is transitioning through its neutral configuration and outputting zero torque to the first drive wheel 24A, the second gearbox 38A will continue to transmit 100 Nm to the second drive wheel 24B. Thus, during gear shifting the power output by the powertrain 30 may be momentarily decreased.

In some embodiments, the control unit 50 will control the powertrain 30 such that, during gear shifting in one gearbox, the power output of the other gearbox is adjusted so that the total power output by the powertrain 30 remains substantially a constant. For example, in the example above, when the total requested power is 200 Nm, the control unit 50 directs the first motor 32A to produce the entirety of the requested torque (i.e., 200 Nm) when the second gearbox 38B is being gear shifted, and directs the second motor 32B to produce 200 Nm of torque when the first gearbox 38A is being gear shifted. After gear shifting is complete, the control unit 50 may instruct each of the motors 34A, 34B to produce half the requested torque.

Figure 3:
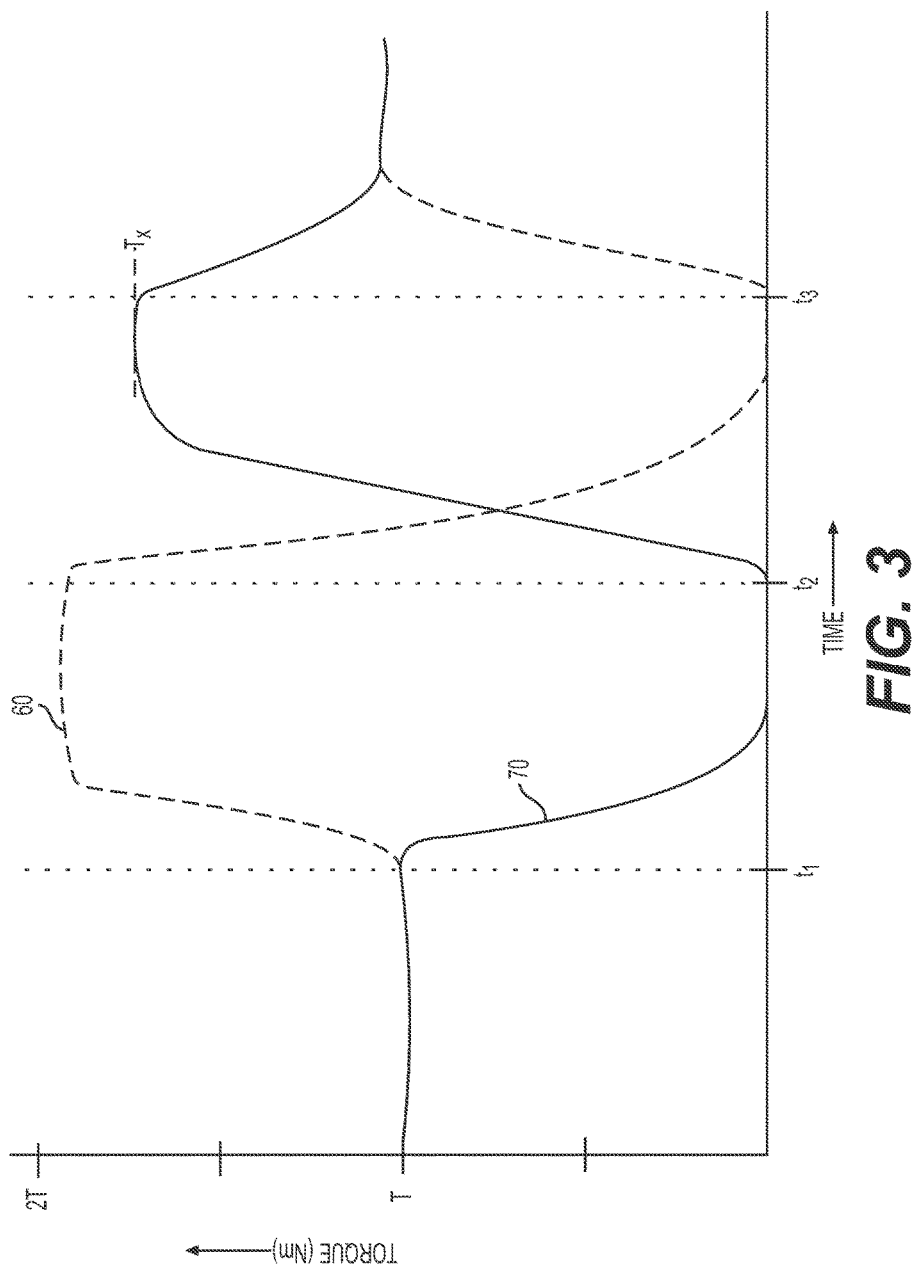
FIG. 3 is a schematic illustration of an exemplary power output of the powertrain of FIG. 2.

FIG. 3 is a schematic illustration of the torque output of the drive wheels during an exemplary split-shifting. In FIG. 3, the solid lines (marked 70) represents the torque output of the drive wheel 24A (connected to the first gearbox 38A) and the dashed lines (marked 60) represents the torque output of the second drive wheel 24B (connected to the second gearbox 38B). With reference to FIG. 3, at any instant of time when the powertrain 30 is outputting 2T Nm (e.g., about 400 Nm) (see $0-t_1$ on the time axis), both first and second motors 34A, 34B will each be producing about half of that torque, or T Nm (e.g., about 200 Nm). During split-shifting, the control unit 50 may initiate gear shifting in the first gearbox 38A first ($t_1$-$t_2$ in the time axis), and initiate gear shifting in the second gearbox 38B only after it receives a signal indicting that the first gearbox 38A has successfully completed gear shifting (see $t_2$-$t_3$ in the time axis). As illustrated in FIG. 3, when gear shifting is occurring in the first gearbox 38A ($t_1$-$t_2$), the control unit 50 increases the torque output of the second motor 32B to about 2T Nm to make up for the loss of power from the first wheel 24A. In some embodiments, during this time (i.e., $t_1$-$t_2$), the control unit 50 may also reduce the torque output of the first motor 32A (i.e., the motor connected to the gearbox that is undergoing gear shifting) to ensure that the torque output of the powertrain 30 does not increase more than the requested value. When the control unit 50 receives a signal indicating that gear shifting of the first gearbox 38A is complete (e.g., at around time $t_2$), the control unit 50 may initiate gear shifting in the second gearbox 38B and increase the power output of the first motor 32A to $T_X$ (see FIG. 3) to make up for the loss of torque from the second gearbox 38B. In some embodiments, during this time (i.e., $t_2$-$t_3$), the control unit 50 may increase the torque output of the first motor 32A to about 2T Nm (i.e., $T_X \approx 2T$ Nm) to make up for the loss of power from the second gearbox 38B.

In some embodiments, when gear shifting the second gearbox 38B (i.e., $t_2$-$t_3$ in FIG. 3), the control unit 50 may adjust the torque output of the first motor 32A to a different value (for example, $T_X$=a×2T Nm, where "a" may be a function of the gear ratio of the gearboxes) to maintain a substantially constant torque at the wheels (and thus a consistent drive feel). For example, in an embodiment, where each of the motors are producing T Nm of torque, and the control unit 50 is split-shifting from a low gear (having, for example, a gear ratio of 3:1) to a high gear (having, for example, a gear ratio of 1:1), the control unit 50 may increase the torque output of the second motor 32B to 2T Nm (and, in some embodiments, decrease the torque output of the first motor 32A to zero) when gear shifting the first gearbox 38A (i.e., between $t_1$-$t_2$ in FIG. 3). After the gear shifting of the first gearbox 38A is complete, the control unit 50 may initiate gear shifting of the second gearbox 38B. During this time (i.e., between $t_2$-$t_3$ in FIG. 3), the control unit 50 may control the first motor 32A to produce a value of torque equal to about (gear ratio of the low gear/gear ratio of high gear)×2T=3/1×2T Nm. Similarly, when shifting from the high gear to the low gear, the control unit 50 may control the first motor 32A to produce a torque value of about ⅓*2T Nm when gear shifting the second gearbox 38B (i.e., $t_2$-$t_3$). During this time, in some embodiments, the control unit 50 may also instruct the second motor 32B to produce zero torque. After gear shifting is complete in the second gearbox 38B, the control unit 50 may restore equal torque production from both motors 32A, 32B.

In the embodiments described above, the control unit 50 doubles the torque output of the second motor 32B when the first gearbox 38A is undergoing gear shifting, and adjusts the torque output of the first motor 32A to value sufficient to maintain a substantially constant torque at the wheels (i.e., to $T_X$) when the second gearbox 38B is undergoing gear shifting. In some embodiments, the control unit 50 may increase the torque output of each motor 32A, 32B based on the power rating (e.g., torque output capacity) of each motor. For instance, in the embodiment described with reference to FIG. 3, if the maximum torque output capacity of each motor 32A, 32B is only 1.5T Nm, the control unit 50 may only increase the torque output of the first motor 32A to 1.5T Nm (or to a value less than 1.5T Nm) when the second gearbox 38B is undergoing gear shifting, and increase the torque output of the second motor 32B to a value less than or equal to 1.5T Nm when the first gearbox 38A is undergoing gear shifting.

Figure 4:
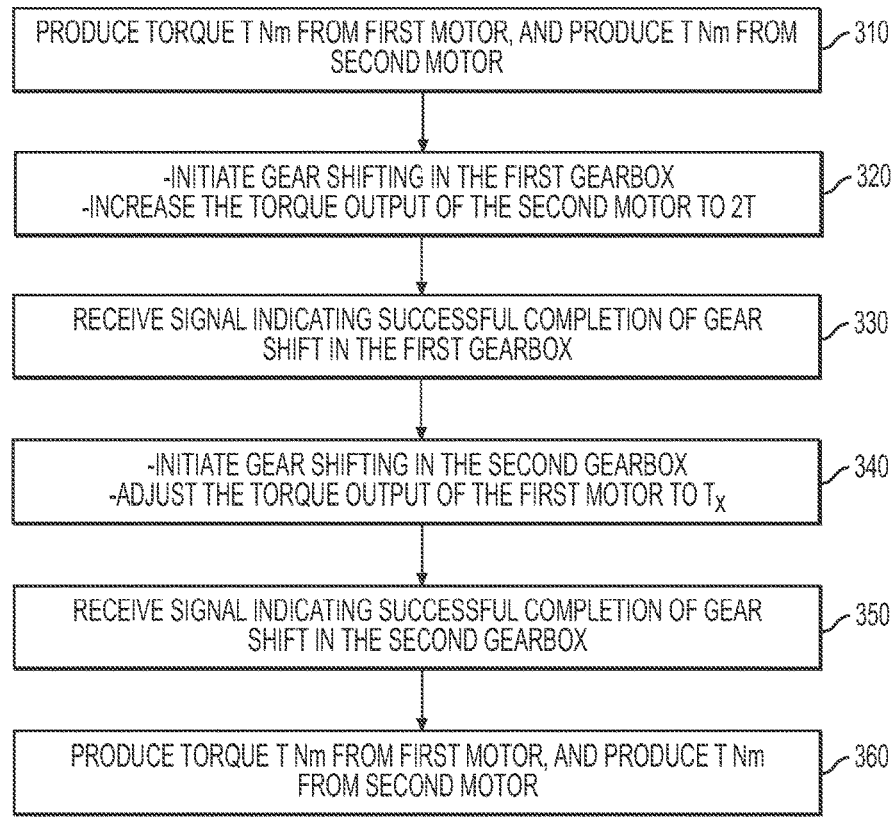
FIG. 4 illustrates an exemplary method of controlling the powertrain of FIG. 2.

FIG. 4 illustrates an exemplary method 300 of controlling the powertrain 30 of FIG. 2 using split-shifting. During operation, the control unit 50 may control the first and second motors 32A, 32B (via inverters 34A and 34B) to produce a torque of T Nm so that the powertrain 30 outputs a torque of 2T Nm (step 310). When control unit 50 determines that gear shifting is desired (e.g., based on inputs to the control unit), gear shifting is initiated in the first gearbox 38A and the second motor 32A is controlled to produce a torque output of about 2T Nm (step 320). When the control unit 50 receives a signal from sensor 36 indicating that gear shifting in the first gearbox 38A is complete (step 330), gear shifting is initiated in the second gearbox 38B and the torque output of the first motor 32A is adjusted to about $T_X$ Nm (step 340). As explained previously, in some embodiments, the value of $T_X$ may be about 2T Nm. And, in some embodiments, to maintain a substantially constant torque at the drive wheels during gear shifting, the value of $T_X$ may be determined based on, among other factors, the gear ratios of the gear boxes. When the control unit 50 receives a signal indicating that gear shifting in the second gearbox 38B is complete (step 350), the torque output of both the motors 32A, 32B are changed to T Nm (step 360).

While principles of the present disclosure are described herein with reference to powertrains for electric buses, it should be understood that the disclosure is not limited thereto. Rather, the systems and methods described herein may be employed in any type of electric vehicle. Also, those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method of controlling a power train of a vehicle, comprising:
    directing power from a first power source to a first drive wheel of an axle through a first gearbox;
    independently directing power from a second power source to a second drive wheel of the axle through a second gearbox, wherein the first gearbox and the second gearbox both include at least a first gear ratio and a second gear ratio;
    initiating a gear shift in the first gearbox and the second gearbox at different times; and
    increasing a torque output of the second power source to a first torque value when the first gearbox is being gear shifted, and adjusting a torque output of the first power source to a second torque value when the second gearbox is being gear shifted, wherein (i) the first torque value is equal to about a sum of the torque output of the first power source and the torque output of the second power source prior to when gear shift is initiated in the first gearbox, and (ii) the second value is equal to about a product of the first torque value and a function of a ratio of the first gear ratio and the second gear ratio.

2. The method of claim 1, wherein initiating a gear shift includes initiating a gear shift in the second gearbox after receipt of a signal indicating that the first gearbox has completed gear shifting.

3. The method of claim 1, wherein the first drive wheel is positioned on a left side of the axle and the second drive wheel is positioned on a right side of the axle, and wherein initiating a gear shift includes (a) initiating a gear shift in the second gearbox after completion of a gear shift in the first gearbox when the vehicle is making a left turn, and (b) initiating a gear shift in the first gearbox after completion of a gear shift in the second gearbox when the vehicle is making a right turn.

4. The method of claim 1, wherein the first power source is a first electric motor and the second power source is a second electric motor.

5. A method of controlling a power train of a vehicle, comprising:
    directing power from a first power source to a first drive wheel of an axle through a first gearbox;
    directing power from a second power source to a second drive wheel of the axle through a second gearbox;
    initiating a first gear shift in the first gearbox;
    receiving, at a control unit, a first signal indicating completion of the first gear shift;
    initiating a second gear shift in the second gear box after receipt of the first signal;
    decreasing a torque output of the first power source in a time period between initiation of the first gear shift and initiation of the second gear shift; and
    increasing a torque output of the second power source, in a time period between initiation of the first gear shift and initiation of the second gear shift, to be equal to about a sum of the torque output of the first power source and a torque output of the second power source prior to when the first gear shift is initiated.

6. The method of claim 5, wherein decreasing a torque output of the first power source includes decreasing the torque output to be about zero.

7. The method of claim 5, further including decreasing the torque output of the second power source and increasing the torque output of the first power source during the second gear shift.

8. The method of claim 5, further including receiving, at the control unit, a second signal indicating completion of the second gear shift.

9. The method of claim 8, further including increasing a torque output of the second power source and decreasing a torque output of the first power source after receiving the second signal.

10. The method of claim 8, further including controlling the torque outputs of the first power source and the second power source to be substantially equal after receiving the second signal.

11. The method of claim 5, wherein the first gearbox and the second gearbox both include at least a first gear ratio and a second gear ratio, and the method further includes adjusting a torque output of the second power source to be a first torque value during the first gear shift, and adjusting a torque output of the first power source to be a second torque value during the second gear shift, wherein (i) the first torque value is equal to about a sum of the torque output of the first power source and the torque output of the second power source prior to when the first gear shift is initiated, and (ii) the second value is equal to about a product of the first torque value and a function of a ratio of the first gear ratio and the second gear ratio.

12. The method of claim 5, wherein the vehicle is a heavy-duty vehicle, the first power source is a first electric motor, and the second power source is a second electric motor.

13. A method of controlling a power train of a vehicle, comprising:
    directing power from a first electric motor to a first drive wheel of an axle through a first gearbox;
    directing power from a second electric motor to a second drive wheel of the axle through a second gearbox;
    performing a first gear shift in the first gearbox;
    increasing a torque output of the second electric motor during the first gear shift to be about a first torque value, the first torque value being equal to a sum of a torque output of the first electric motor and the torque output of the second electric motor before performing the first gear shift;
    performing a second gear shift in the second gearbox after completion of the first gear shift; and
    decreasing the torque output of the second electric motor and increasing the torque output of the first electric motor to be about a second torque value during the second gear shift, the second torque value being equal to a product of the first torque value and a function of a ratio of gear ratios of at least one of the first gear box and the second gear box.

14. The method of claim 13, further including decreasing the torque output of the first electric motor during the first gear shift.

15. The method of claim 1, wherein initiating the gear shift in the first gearbox and the second gearbox at different times includes initiating a gear shift in the second gearbox a predetermined time after initiating the gear shift in the first gearbox.

16. The method of claim 5, wherein (a) when the vehicle is making a left turn, the first drive wheel is positioned on a left side of the axle and the second drive wheel is positioned on a right side of the axle, and (b) when the vehicle is making a right turn, the first drive wheel is positioned on a right side of the axle and the second drive wheel is positioned on a left side of the axle.

17. The method of claim 13, wherein the vehicle is an electric vehicle and the first power source is a first electric motor and the second power source is a second electric motor.

18. The method of claim 17, wherein the first and second electric motors are substantially similar electric motors.

19. The method of claim 13, wherein (a) when the vehicle is making a left turn, the first drive wheel is positioned on a left side of the axle and the second drive wheel is positioned on a right side of the axle, and (b) when the vehicle is making a right turn, the first drive wheel is positioned on a right side of the axle and the second drive wheel is positioned on a left side of the axle.

20. The method of claim 13, wherein performing the second gear shift after completion of the first gear shift includes initiating the second gear shift a predetermined time after initiating the first gear shift.

* * * * *